US009237175B2

(12) United States Patent
Wang et al.

(10) Patent No.: US 9,237,175 B2
(45) Date of Patent: Jan. 12, 2016

(54) INTERNET PROTOCOL (IP) ADDRESS VIRTUALIZATION FOR TERMINAL SERVER SESSIONS

(75) Inventors: Huei Wang, Seattle, WA (US); Nk Srinivas, Sammamish, WA (US); Ashwin Palekar, Sammamish, WA (US); Olga B. Ivanova, Redmond, WA (US); Costin Hagiu, Sammamish, WA (US); Rouslan Beletski, Kenmore, WA (US); Sriram Sampath, Redmond, WA (US); Seema J. Lukose, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 886 days.

(21) Appl. No.: 12/341,523

(22) Filed: Dec. 22, 2008

(65) Prior Publication Data

US 2010/0161771 A1 Jun. 24, 2010

(51) Int. Cl.
*G06F 15/177* (2006.01)
*H04L 29/06* (2006.01)
*H04L 29/08* (2006.01)
*H04L 29/12* (2006.01)

(52) U.S. Cl.
CPC ......... *H04L 65/4069* (2013.01); *H04L 61/1511* (2013.01); *H04L 61/2015* (2013.01); *H04L 67/16* (2013.01); *H04L 67/306* (2013.01)

(58) Field of Classification Search
USPC ................................. 709/202, 228, 245, 220
See application file for complete search history.

(56) References Cited

U.S. PATENT DOCUMENTS

| | | | |
|---|---|---|---|
| 5,923,854 A | 7/1999 | Bell et al. | |
| 6,445,704 B1 | 9/2002 | Howes et al. | |
| 6,859,835 B1* | 2/2005 | Hipp | 709/227 |
| 6,891,837 B1* | 5/2005 | Hipp et al. | 370/397 |
| 7,093,288 B1 | 8/2006 | Hydrie et al. | |
| 7,120,697 B2 | 10/2006 | Aiken, Jr. et al. | |
| 7,210,147 B1 | 4/2007 | Hipp et al. | |
| 7,430,611 B2 | 9/2008 | Aiken, Jr. et al. | |
| 2002/0138578 A1* | 9/2002 | Zhou | 709/206 |
| 2004/0103310 A1* | 5/2004 | Sobel et al. | 713/201 |
| 2005/0198387 A1* | 9/2005 | Willis | 709/245 |

(Continued)

OTHER PUBLICATIONS

Brumpton, R., "Virtual IP Addressing in Citrix Presentation Server," http://www.msterminalservices.org/articles/Virtual-IP-addressing-Citrix-Presentation-Server.html, MSTerminalServices.org, Section: Articles & Tutorials:: Virtualization, Nov. 1, 2006, p. 1-12.

(Continued)

*Primary Examiner* — Ryan Jakovac
(74) *Attorney, Agent, or Firm* — Kate Drakos; Micky Minhas

(57) ABSTRACT

Techniques are disclosed for virtualizing internet protocol (IP) addresses in terminal server sessions. A client component comprises a layer service provider (LSP) and a name service provider (NSP) that intercept a socket call to associate a port with a socket for a terminal server session. The client component queries a server component for a virtual IP address, and the server component determines whether the terminal server session can use a virtual IP address. Where the session can use a virtual IP address, the server returns a virtual IP address and the client component binds the socket call to the virtual IP address. Where the session cannot use a virtual IP address, the server returns an indication of that, and the client component acts as a proxy for that socket call and any future calls for that socket.

20 Claims, 4 Drawing Sheets

(56) References Cited

U.S. PATENT DOCUMENTS

2006/0075080 A1*   4/2006   Burr et al. .................... 709/223
2007/0198656 A1    8/2007   Mazzaferri et al.
2011/0026531 A1*   2/2011   Deutsch et al. .......... 370/395.53

OTHER PUBLICATIONS

"Citrix XenApp on Windows Terminal Services: A Feature Analysis," http://www.citrix.com/site/resources/dynamic/salesdocs/Citrix-XenApp5-Terminal-Services-2003-2008-Feature-Analysis,pdf, Jul. 2008, 15 pages.

Schnoll, J., "Presentation Virtualization with Enhanced Terminal Services," Microsoft Corporation, http://technet.microsoft.com/en-us/magazine/cc987539.aspx, 2008, 7 pages.

"Virtualized Domain Name System and IP Addressing Environments," https://secure.nixu.com/doc/White_Paper_Virtualized_DNS_and_IP_Addressing_Environments.pdf, Nixu Software Limited 2006-2007, Sep. 2007, p. 1-6.

* cited by examiner

INTERNET PROTOCOL (IP) ADDRESS VIRTUALIZATION FOR TERMINAL SERVER SESSIONS

BACKGROUND

A terminal server thin client, such as provided by REMOTE DESKTOP SERVICES™ in WINDOWS SERVER™, allows a user to access applications and data running on a remote computer over a communications network. Some implementations allow a user to access the entire desktop of the remote computer running a terminal server program. The user may access the remote computer with a full computer running any operating system that the terminal server protocol supports, as well as a bare-bones computer that has enough power to support the protocol. Only the user interface (UI) of an application is presented to the user. Any user input is sent over the communications network to the remote computer, where the application processing occurs.

In the terminal server environment, all applications on a terminal server session share a single internet protocol (IP) address, or the same IP addresses where the host computer has a plurality of IP addresses. Furthermore, where there are multiple terminal server sessions running on the host computer, all of those sessions share the same IP address or addresses. However, some applications that can be run in a terminal server environment use a corresponding IP address as a way to identify or track the application. For instance, some internet service providers (IPSs) have requirements to track (e.g. duration of a session, and when that session occurs) a user when he or she is surfing the INTERNET™. Since all applications in a terminal server environment share a single IP address, it is not possible to run simultaneously multiple instances of an application that uses an IP address for identification purposes.

In light of these constraints, it would be beneficial to enable applications executing through a terminal server session to have a unique IP address.

SUMMARY

An embodiment of the present invention comprises techniques for IP address virtualization for terminal server sessions.

The present systems and techniques enable each of a plurality of terminal server sessions to have a unique IP address, or a particular application (e.g. process) within a terminal server session to have its own unique IP address. This addresses some application compatibility issues where an application runs inside a terminal server session and expects to have its own IP address. This also addresses the situation where government regulations or internet service provider (ISP) requirements exist to track network usage and activity per terminal server user. Further, it helps ISPs configure access control models based on a user's IP address.

In an exemplary embodiment, a client component comprises a layer service provider (LSP) and a name service provider (NSP) that intercept a socket call to associate a port with a socket for a terminal server session. The client component queries a server component for a virtual IP address, and the server component determines whether the terminal server session can use a virtual IP address. Where the session can use a virtual IP address, the server returns a virtual IP address and the client component binds the socket call to the virtual IP address. Where the session cannot use a virtual IP address, the server returns an indication of that, and the client component acts as a proxy for that socket call and any future calls for that socket.

Using these techniques allows for a plurality of terminal server sessions to have their own unique virtual IP address. Furthermore, all applications, unless for instance specified in an exclude list, running in a session may be virtualized. Additionally, a terminal server client may supply an IP address to be virtualized for the terminal server session. Also, in an embodiment, a virtualized IP address is used only where the target address of the application or session is reachable from the virtualized IP address, to ensure that no undesirable side effects occur to an application in a system that has more than one active network adapter (and a corresponding plurality of IP addresses).

In an embodiment, an IP virtualization server that implements aspects of the present disclosure may allocate a virtual IP address to a terminal server client at the time that the terminal server client initializes a terminal server session and support leasing that IP address from a dynamic host configuration protocol (DHCP) or from a pool of static IP addresses. In another embodiment, the terminal server client may supply to the IP virtualization server an IP address that it wishes to use as a virtual IP address.

In another embodiment, there exists a client component and a server component. The server component is implemented as a service and is responsible for allocating, managing, and distributing IP addresses allocated from either DHCP or from a pool of static IP addresses. The client component is implemented as a WINSOCK™ layer service provider (LSP) and name service provider (NSP) that intercept and then modify socket calls.

In this embodiment, when a WINSOCK application makes a bind or connect call, the WINSOCK LSP intercepts the call and passes it to an IP virtualization client. The IP virtualization client calls the IP virtualization server to request a virtual IP address, and the IP virtualization server returns a virtual IP address when the application may be virtualized. The IP virtualization client explicitly binds the socket to the virtual IP and the application uses this virtual IP address for subsequent network communication. Where the application may not be virtualized, the client will perform the role of a proxy and not modify the WINSOCK call.

It can be appreciated by one of skill in the art that one or more various aspects of the disclosure may include but are not limited to circuitry and/or programming for effecting the herein-referenced aspects of the present disclosure; the circuitry and/or programming can be virtually any combination of hardware, software, and/or firmware configured to effect the herein-referenced aspects depending upon the design choices of the system designer.

The foregoing is a summary and thus contains, by necessity, simplifications, generalizations and omissions of detail. Those skilled in the art will appreciate that the summary is illustrative only and is not intended to be in any way limiting.

DETAILED DESCRIPTION

Figure 1:
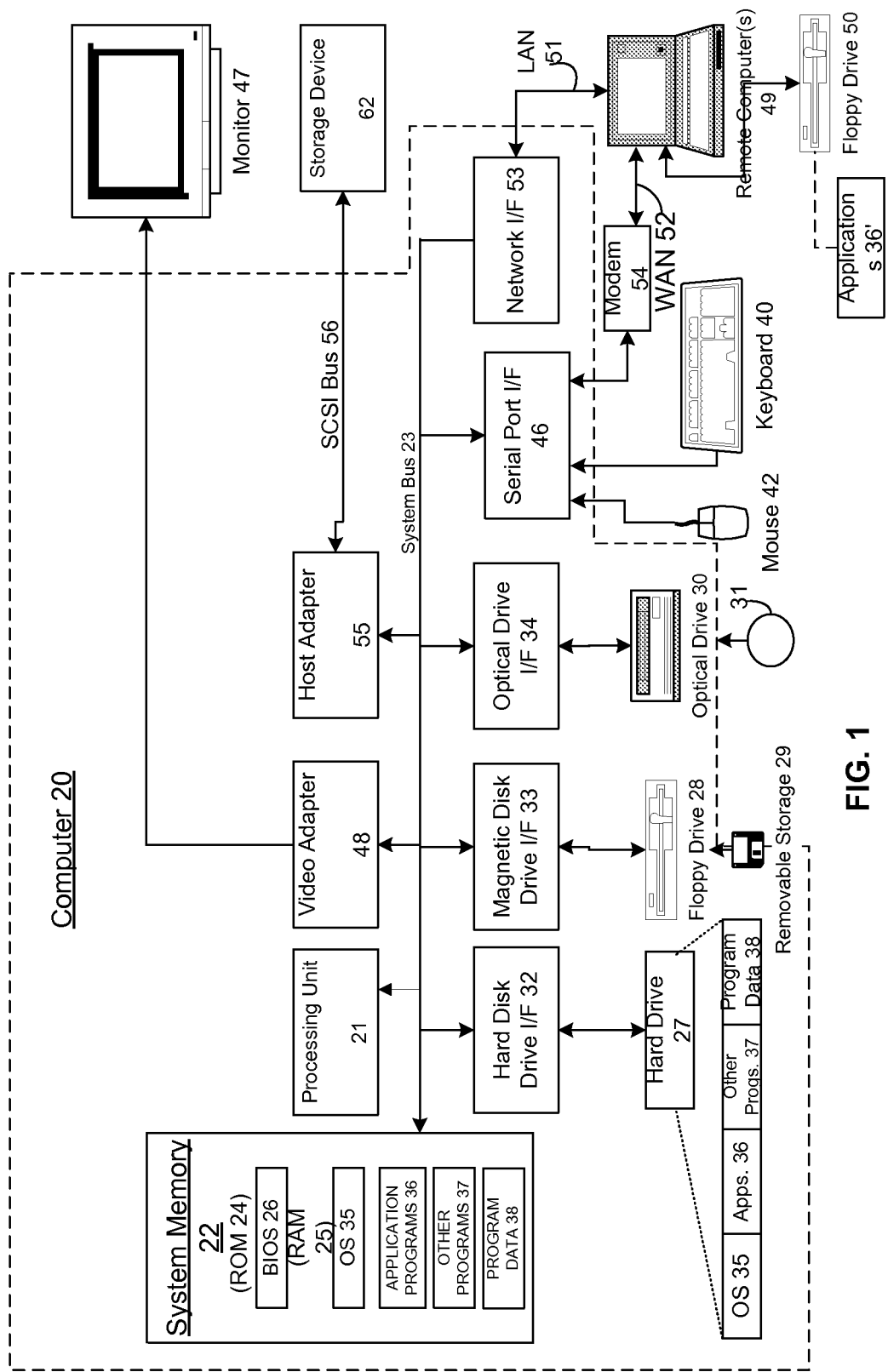
FIG. 1 depicts an example computer system wherein aspects of the present disclosure can be implemented.

Embodiments of the present disclosure may execute on one or more computers. FIG. 1 and the following discussion are intended to provide a brief general description of a suitable computing environment in which the disclosure may be implemented. One skilled in the art can appreciate that some or all of the components of the computer system of FIG. 1 can be used to effectuate the computers of FIGS. 2, 3 and 3A.

The term circuitry used through the disclosure can include specialized hardware components such as hardware interrupt controllers, hard drives, network adaptors, graphics processors, and audio codecs for example. In the same or other embodiments circuitry can include microprocessors configured to perform function(s) by firmware or by set switches. In the same or other example embodiments circuitry can include one or more logical processors, e.g., one or more cores of a multi-core general processing unit. The logical processor(s) in this example can be configured by software instructions embodying logic operable to perform function(s) that are loaded from memory, e.g., RAM, ROM, firmware, and/or virtual memory. In example embodiments where circuitry includes a combination of hardware and software an implementer may write source code embodying logic that is subsequently compiled into machine readable code that can be processed by the logical processor. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

Referring now to FIG. 1, an exemplary general purpose computing system is depicted. The general purpose computing system can include a conventional computer 20 or the like, including a general purpose processing unit 21 that can include one or more logical processors, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the computer 20, such as during start up, is stored in ROM 24. The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. In some example embodiments computer executable instructions embodying aspects of the present disclosure may be stored in ROM 24, hard disk (not shown), RAM 25, removable magnetic disk 29, optical disk 31, and/or a cache of general purpose processing unit 21. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the computer 20 through input devices such as a keyboard 40 and pointing device 42. Other input devices (not shown) may include a microphone, joystick, game pad, satellite disk, scanner or the like. These and other input devices are often connected to the general purpose processing unit 21 through a serial port interface 46 that is coupled to the system bus, but may be connected by other interfaces, such as a parallel port, game port or universal serial bus (USB). A display 47 or other type of display device can also be connected to the system bus 23 via an interface, such as a video adapter 48. In addition to the display 47, computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The computer 20 may operate in a networked environment using logical connections to one or more remote computers, such as a remote computer 49. The remote computer 49 may be another computer, a server, a router, a network PC, a peer device or other common network node, and typically can include many or all of the elements described above relative to the computer 20, although only a memory storage device 50 has been illustrated in FIG. 1. The logical connections depicted in FIG. 1 can include a local area network (LAN) 51 and a wide area network (WAN) 52. Such networking environments are commonplace in offices, enterprise wide computer networks, intranets and the Internet.

When used in a LAN networking environment, the computer 20 can be connected to the LAN 51 through a network interface or adapter 53. When used in a WAN networking environment, the computer 20 can typically include a modem 54 or other means for establishing communications over the wide area network 52, such as the Internet. The modem 54, which may be internal or external, can be connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used. Moreover, while it is envisioned that numerous embodiments of the present disclosure are particularly well-suited for computerized systems, nothing in this document is intended to limit the disclosure to such embodiments.

The foregoing detailed description has set forth various embodiments of the systems and/or processes via examples and/or operational diagrams. Insofar as such block diagrams, and/or examples contain one or more functions and/or operations, it will be understood by those within the art that each function and/or operation within such block diagrams, or examples can be implemented, individually and/or collectively, by a wide range of hardware, software, firmware, or virtually any combination thereof.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein.

Figure 2:
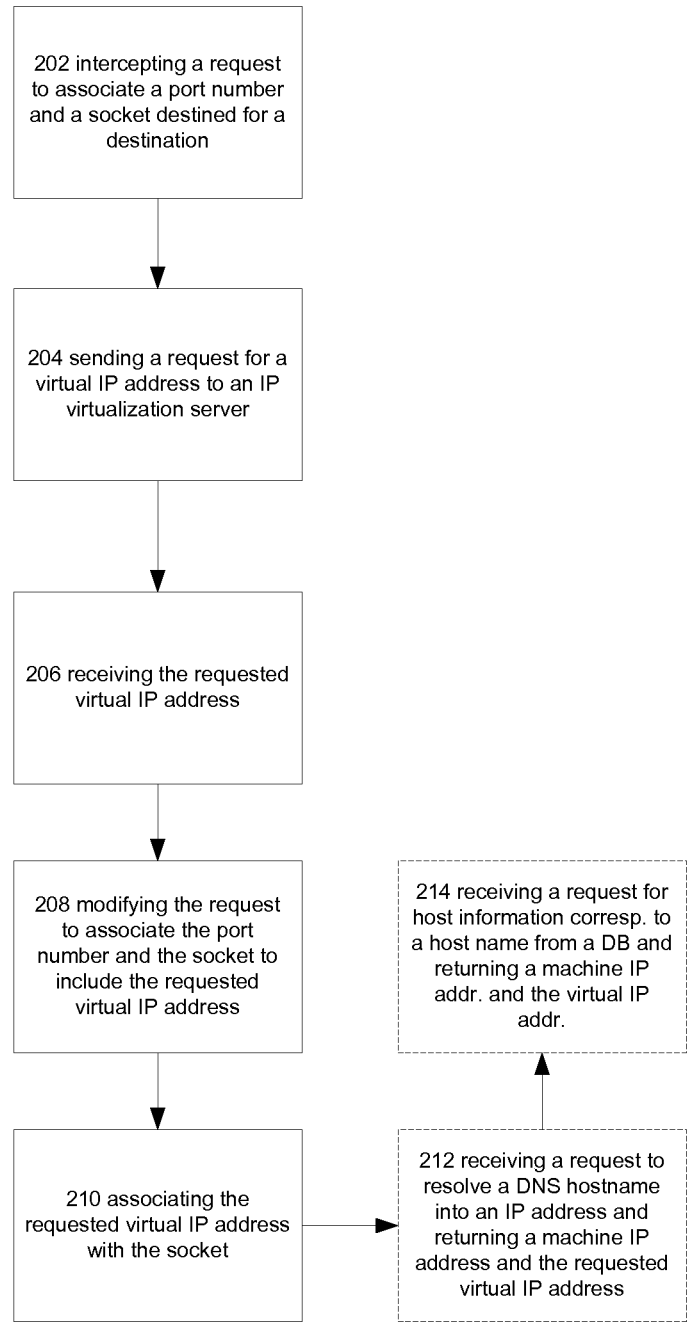
FIG. 2 depicts example operating procedures of a client component.

FIG. 2 depicts example operating procedures of a client component for virtualizing internet protocol (IP) addresses in terminal server sessions.

Operation 202 depicts intercepting a request to associate a port number and a socket destined for a destination. A socket is an end-point for a two-way inter-process communication flow across a communications network, such as the INTERNET™. A socket may be associated with an application process or thread. A socket may serve as an interface between an application process or thread and a transmission control protocol/internet protocol (TCP/IP) stack provided by an operating system. In an embodiment, a socket comprises a protocol (e.g. TCP), a local IP address, a local port number, a remote IP address (where a TCP socket is established), and a remote port number (where a TCP socket is established).

A port number may refer to an identifier for a specific port. A port may be an application-specific or process-specific software construct serving as a communications endpoint used by transport layer protocols, such as TCP and user datagram protocol (UDP).

In an embodiment, the request to associate the port number with the socket is a bind request and is received across a communications network. A bind request, such as the "bind( )" functions found in many high-level programming languages, such as on C++ on the MICROSOFT WINDOWS™ platform, is a request to associate a socket with a socket address structure, i.e. a specified local port number and an IP address. In a client-server architecture, a bind request is typically made on the server side.

In an embodiment, the request to associate the port number with the socket is a connect request and is received from a local application. A connect request, such as the "connect( )" functions found in many high-level programming languages, such as on C++ on the MICROSOFT WINDOWS™ platform, is a request to assign a free local port number to a socket. Where the socket is a TCP socket, the connect request may cause an attempt to establish a new TCP connection. In a client-server architecture, a bind request is typically made on the client side.

In an embodiment, the request to associate the port number with the socket is received by a layered service provider (LSP). In an embodiment, a LSP is a dynamic-link library that uses the MICROSOFT WINDOWS WINSOCK 2 SERVICE PROVIDER INTERFACE™ (SPI) application programming interface (API) to insert itself onto the TCP/IP stack of a computer. Once on the stack, a LSP can intercept and modify inbound and outbound network traffic. IT allows for processing all the TCP/IP traffic taking place between the network and an application accessing the network (e.g. a web browser or an e-mail client).

MICROSOFT WINSOCK™ is a DLL that exposes the WINDOWS SOCKETS API™ to applications—an API that defines how WINDOWS™ network software access network services, such as TCP/IP. It enables an interface between a TCP/IP client application (such as a web browser) and the TCP/IP stack.

In an embodiment, the LSP has a corresponding name service provider (NSP). The NSP provides name resolution for uniform resource locators (URLs) comprising a mapping of URLs and IP addresses. Take a machine with a machine name of "machinename" and an IP address of 192.168.0.9. When queried with "machinename" the NSP returns 192.168.0.9.

In an embodiment, the request is received from a terminal server session. In an embodiment, the request is received from the terminal server session when the session logs into a host.

Operation 204 depicts sending a request for a virtual IP address to as IP virtualization server. A virtual IP address (VIP; VIPA) is an IP address that is not connected to a specific computer or network interface card (NIC) on a computer. While incoming packets may be sent to a virtual IP address, those packets would travel through real network interfaces.

In an embodiment, the requested virtual IP address is a unique IP address. That is, the requested virtual IP address is different from every other IP address and virtual IP address on a sub-network of a communications network. In an embodiment, the requested virtual IP address is different from every other IP address and virtual IP address on a communications network as a whole, such as the INTERNET™.

Operation 206 depicts receiving the requested virtual IP address.

In an embodiment, a terminal server session corresponds to the requested virtual IP address. That, is the terminal server session is assigned the virtual IP address and uses that in communicating across at least one communications network.

In an embodiment, an application within the terminal server session corresponds to the requested virtual IP address. Where there are a plurality of applications executing within a terminal server session (e.g. a web browser and an electronic mail client) each application may have a separate virtual IP address that it uses in communicating across at least one communications network.

Operation 208 depicts modifying the request to associate the port number and the socket to include the requested virtual IP address.

Operation 210 depicts associating the requested virtual IP address with the socket.

Operation 212 depicts the optional operations of receiving a request to resolve a domain name service (DNS) hostname into an IP address; and returning a machine IP address and the requested virtual IP address. In an embodiment, this request may comprise the GetAddrInfo( ) function of the WINSOCK™ API, used in multiple high-level programming languages on the WINDOWS™ operating system.

Operation 214 depicts the optional operations of receiving a request to provide host information corresponding to a host name from a host database; and returning a machine IP address and the requested virtual IP address that correspond to the host name from the host database. In an embodiment, this request may comprise the GetHostByName( ) function of the WINSOCK™ API, used in multiple high-level programming languages on the WINDOWS™ operating system.

Figure 3:
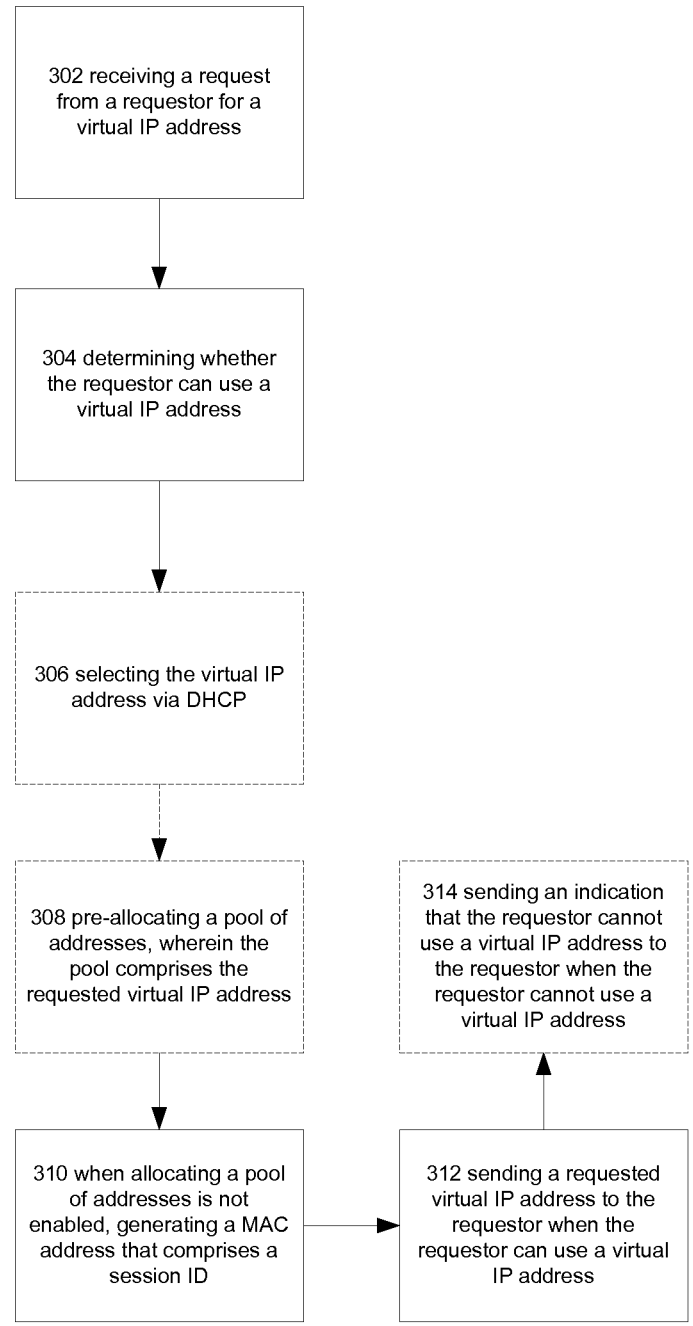
FIG. 3 depicts example operating procedures of a server component.

FIG. 3 depicts example operating procedures of a server component for virtualizing internet protocol (IP) addresses in terminal server sessions.

Operation 302 depicts receiving a request from a requester for a virtual IP address. In an embodiment, this request may be sent by a client that performs the operations depicted in FIG. 2.

Operation 304 depicts determining whether the requester can use a virtual IP address.

In an embodiment, this operation includes attempting to retrieve a IP route entry for the best route to the a destination IP address corresponding to the request. Where the destination IP address is reachable from a virtual IP address that is being considered for the requester, there will be a best route, and it is then known that the requester can use the virtual IP address. Where there is no such IP route entry, then it is known that the requester cannot use the virtual IP address, because it cannot communicate with the destination IP address using the virtual IP address.

In an embodiment, this operation includes determining that the requestor cannot use a virtual IP address when the requestor corresponds to a service process or a system process. One may wish to restrict all system processes, including service processes from utilizing virtual IP addresses. This may be for performance reasons, or to prevent malicious use, as in most embodiments, only one instance of such a process will execute on system. Such processes may include the winlogin and loginui processes of the WINDOWS™ operating system.

In an embodiment, this operation includes determining that the requestor cannot use a virtual IP address when the requester is included in an exclude list, the exclude list comprising applications that cannot use a virtual IP address. Where specific applications are wished to be prevented from using virtual IP addresses, an exclude list may be implemented. This may be a file that contains a delimited list of the applications' names, or a checksum of each application. Where finer granularity than a broad class of applications, such as a subset of system processes discussed above is desired to be excluded from using virtual IP addresses, such an exclude list may allow for this. In an embodiment, the request comprises an identification of the requestor application or process, and this requestor application is checked against the exclude list. If a match is found, it is determined that the requestor cannot use a virtual IP address. If it is not found, it is determined that the requester may use a virtual IP address (or, in the case where there are multiple such determinative operations, that a further determination should be made).

Operation 306 depicts the optional operation of selecting the requested virtual IP address via a dynamic configuration protocol (DHCP). DHCP comprises a protocol for dynamically assigning IP addresses to computing devices on a communication network.

Operation 308 depicts the optional operation of pre-allocating a pool of addresses comprising at least one virtual IP address, wherein the pool of addresses comprises the requested virtual IP address. For instance, the pool of addresses may comprise all IP addresses in the group 155.155.155.x. The actor may reserve those IP addresses for virtual IP addresses, then assign one to each appropriate requester, such that no two requestors receive the same requested virtual IP address.

Operation 310 depicts the optional operation of when a allocating a pool of addresses is not enabled, generating a MAC address that comprises a session ID, and using the MAC address to request an IP address from a DHCP server. That IP address may then be used as the virtual IP address.

Operation 312 depicts sending a requested virtual IP address to the requester when the requester can use a virtual IP address. Upon receiving a request for a virtual IP address, the receiver may check whether the requester can use any of the available virtual IP addresses that it may be assigned to reach a destination that is the other terminal end of the socket connection.

Operation 314 depicts the optional operation of sending an indication that the requester cannot use a virtual IP address to the requester when the requester cannot use a virtual IP address. Using the example of operation 306, for instance, if there are only virtual IP addresses of the form 192.168.x.x available, and the requester needs a different virtual IP address, such as to reach a destination across the internet (so, perhaps a virtual IP address of 155.155.0.155) then the requester cannot use a virtual IP address, and the receiver sends an indication of such to the requester. Then, the requester may act as a proxy for all future intercepted communications intended for that recipient and pass them on to the intended recipient of each communication untouched.

Figure 4:
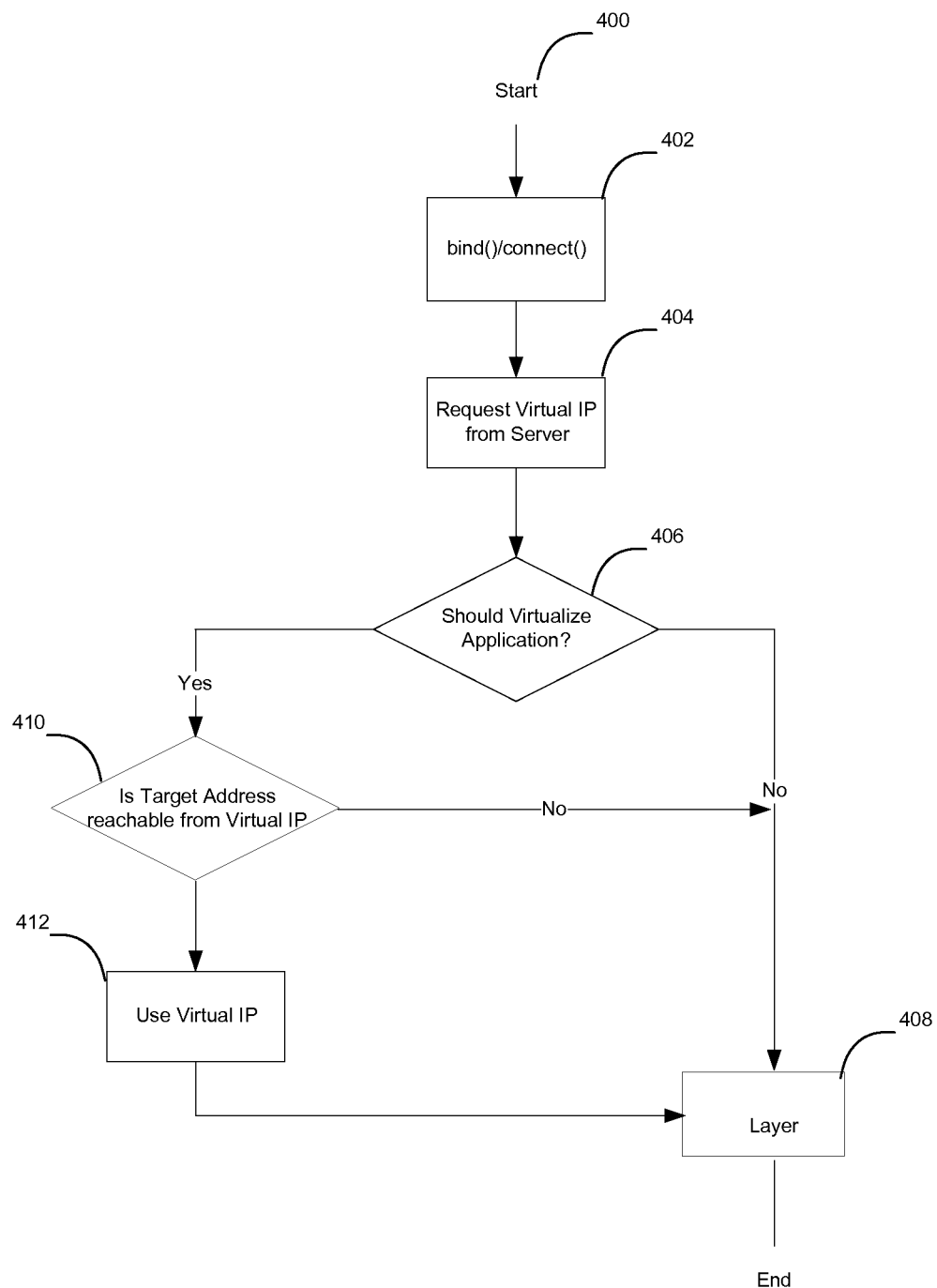
FIG. 4 depicts an example logical flow diagram of a client component working in conjunction with a server component.

FIG. 4 depicts an example logical flow diagram of a client component working in conjunction with a server component.

The flow starts at 400. This may be triggered, for example, by a terminal server session initializing. In this embodiment, where an application running in the terminal server session makes a connect request or receives a bind call 402, that request or call is intercepted by the client component. The client component (in an embodiment, the layered service provider (LSP)) then requests a virtual IP address from the server component 404. The server component determines whether the application should receive a virtual IP address 406. Where it may not receive a virtual IP address, it passes the request to the layer service provider 408 and that acts as a proxy for all further communications on that socket, not modifying communications sent or received on it. Where the server component determines that the application may receive a virtual IP address, the server component then determines whether the application can receive a virtual IP address 410. Where the application can receive a virtual IP address, a virtual IP address is used 412, and then the layer service provider 408 uses that virtual IP address in all further communications on the socket. Where the application cannot receive a virtual IP address, the later service provider 408 acts as a proxy for all further communications on the socket.

What is claimed:

1. A method for virtualizing internet protocol (IP) addresses in terminal server sessions, comprising:

intercepting a request from a first requestor process to associate a port number and a socket destined for a destination;

sending a request for a virtual IP address to an IP virtualization server;

receiving a requested virtual IP address from the IP virtualization server;

modifying the request to associate the port number and the socket to include the requested virtual IP address;

associating the requested virtual IP address with the socket;

intercepting a second request from a second requestor process to associate a second port number and a second socket destined for a second destination, the second destination comprising the destination or another destination;

sending a request for a second virtual IP address to the IP virtualization server;

receiving an indication from the IP virtualization server that the second requestor process is not capable of using a virtual IP address to reach the second destination; and acting as a proxy for the second request and all future communication on the second socket by passing the communication on to the intended recipient without modifying the communication.

2. The method of claim 1, where intercepting the request to associate the port number with the socket comprises:
receiving a bind request across a communications network.

3. The method of claim 1, where intercepting the request to associate the port number with the socket comprises:
receiving a connect request from a local application.

4. The method of claim 1, wherein intercepting the request to associate the port number with the socket comprises:
receiving the request from a layered service provider (LSP).

5. The method of claim 1, wherein the requested virtual IP address is a unique IP address.

6. The method of claim 1, wherein intercepting the request comprises intercepting the request originated from a terminal server session.

7. The method of claim 6, wherein intercepting the request comprises intercepting the request originated from an application within the terminal server session.

8. The method of claim 1, further comprising:
receiving a request to resolve a domain name service (DNS) hostname into an IP address; and
returning a machine IP address and the requested virtual IP address.

9. The method of claim 1, further comprising
receiving a request to provide host information corresponding to a host name from a host database; and
returning a machine IP address and the requested virtual IP address that correspond to the host name from the host database.

10. The method of claim 1, wherein
the indication from the IP virtualization server indicates at least one of: the second requestor process is on an exclusion list, no route exists between the second requestor process and the second destination using a virtual IP address, and the requestor process is a service process or a system process.

11. The method of claim 6, wherein intercepting the request comprises:
intercepting the request from the terminal server session when the session logs into a host.

12. A computer readable storage medium excluding signals, comprising computer readable instructions that, when executed on a processor perform operations comprising:
intercepting a request from a first process in a terminal server session to associate a port number and a socket destined for a destination, the request comprising either a bind request or a connect request;
sending a request for a virtual IP address to a IP virtualization server, the virtual IP address comprising a unique IP address;
receiving the requested virtual IP address when the terminal server session can use the requested virtual IP address;
modifying the request to associate the port number and the socket to include the virtual IP address;
associating the virtual IP address with the socket;
intercepting a second request from a second process in a terminal server session to associate a second port number and a second socket destined for a second destination, the second destination comprising the destination or another destination;
sending a request for a second virtual IP address to the IP virtualization server;
receiving an indication from the IP virtualization server that the second process is not capable of using a virtual IP address to reach the second destination; and
acting as a proxy for the second request and all future communication on the second socket by passing the communication on to the intended recipient without modifying the communication.

13. A system for virtualizing internet protocol (IP) addresses in terminal server sessions, comprising:
a processor; and
a memory communicatively coupled to the processor when the system is operational, the memory bearing processor-executable instructions that, upon execution by the processor, cause the system to at least:
intercept a first request to associate a port number and a socket destined for a destination;
send a second request for a virtual IP address to an IP virtualization server;
receive a requested virtual IP address from the IP virtualization server;
modify the first request to associate the port number and the socket to include the requested virtual IP address;
associate the requested virtual IP address with the socket;
intercept a third request to associate a second port number and a second socket destined for a second destination, the second destination comprising the destination or another destination;
send a fourth request for a second virtual IP address to the IP virtualization server;
receive an indication from the IP virtualization server that a process from which the second request originated cannot use a virtual IP address to reach the second destination; and
act as a proxy for the second request and all future communication on the second socket by passing the communication on to the intended recipient without modifying the communication.

14. The system of claim 13, wherein the memory further bears processor-executable instructions that, upon execution by the processor, cause the system to at least:
intercept a fifth request to send a communication to the second destination;
determine, based on the fifth request identifying the second destination, to forward the communication associated with the fifth request to the second destination without sending the fifth request to the IP virtualization server.

15. The system of claim 13, wherein the request to associate the port number with the socket is a bind request and is received across a communications network.

16. The system of claim 13, wherein the request to associate the port number with the socket is a connect request and is received from a local application.

17. The system of claim 13, wherein the request to associate the port number with the socket is received by a layered service provider (LSP).

18. The system of claim 13, wherein the requested virtual IP address is a unique IP address.

19. The system of claim 13, wherein the memory further bears processor-executable instructions that, upon execution by the processor, cause the system to at least:
receive a request to resolve a domain name service (DNS) hostname into an IP address; and
return a machine IP address and the requested virtual IP address.

20. The system of claim 13, wherein the memory further bears processor-executable instructions that, upon execution by the processor, cause the system to at least:
- receive a request to provide host information corresponding to a host name from a host database; and
- return a machine IP address and the requested virtual IP address that correspond to the host name from the host database.

* * * * *